J. P. HANSEN.
COMBINED PRINTING, ENLARGING, AND DIMINISHING APPARATUS FOR PHOTOGRAPHIC USE.
APPLICATION FILED NOV. 15, 1918.

1,313,815.
Patented Aug. 19, 1919.
2 SHEETS—SHEET 1.

Inventor:
Jens Peter Hansen
Mmm&Co
Attorneys

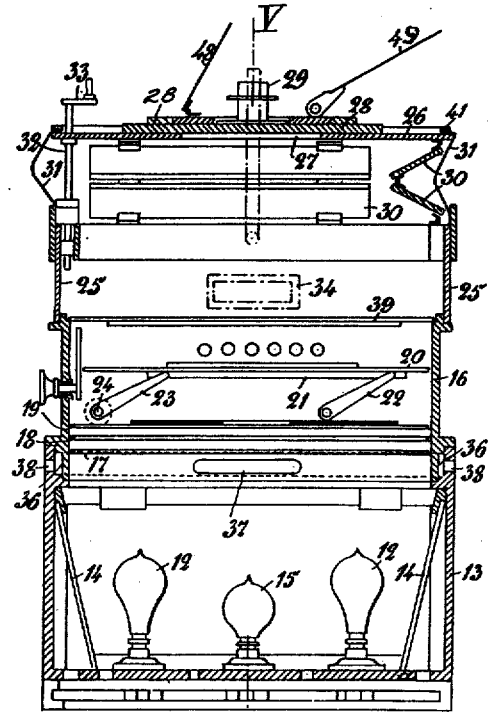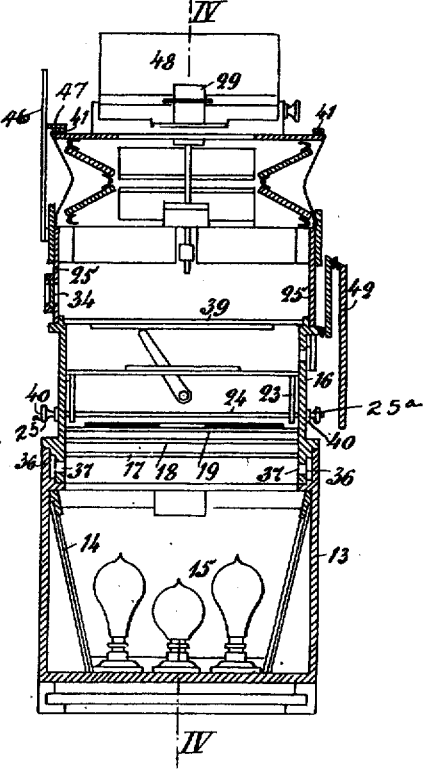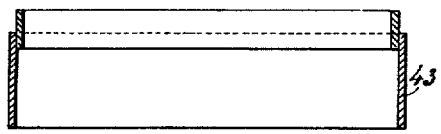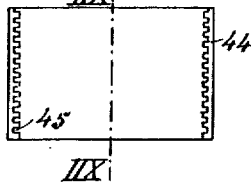

UNITED STATES PATENT OFFICE.

JENS PETER HANSEN, OF COPENHAGEN, DENMARK.

COMBINED PRINTING, ENLARGING, AND DIMINISHING APPARATUS FOR PHOTOGRAPHIC USE.

1,313,815. Specification of Letters Patent. Patented Aug. 19, 1919.

Application filed November 15, 1918. Serial No. 262,749.

*To all whom it may concern:*

Be it known that I, JENS PETER HANSEN, factory manager, a subject of the Kingdom of Denmark, and residing at Copenhagen, No. 10 Yacoby's Allé, Denmark, have invented certain new and useful Improvements in Combined Printing, Enlarging, and Diminishing Apparatus for Photographic Use, of which the following is a specification.

When printing and enlarging a vertical position of the negative is often adopted. This involves however sometimes certain difficulties, as this arrangement requires a horizontal position of the enlarger and the stand for the sensitive paper and consequently a rather considerable floor-area, which means a rather large dark room of which few photographers actually dispose.

The present invention consequently concerns an apparatus with horizontal position of the negative, and arranged in such way that the light sensitive paper is placed above this. Various important technical advantages are hereby obtained. At the same time, the present invention embodies a series of other improvements mentioned below:—

The invention is shown on the drawing where—

(Fig. 1.)

Fig. 4 is a vertical section through the printing apparatus on the top of which is placed the camera and the mirror frame, all on the line IV—IV Fig. 5.

Fig. 5 is a vertical section on the line V—V. Fig. 4.

Fig. 6 is a frame to be inserted between the printing apparatus and the camera in order to increase the camera extension.

Fig. 7 is a three-sided frame with grooves for the inserting of a vignette and intended for being placed inside the camera on the top of the glass carrying the negative.

Fig. 8 is a vertical section on the line 8—8 (Fig. 7.)

Figure 1:
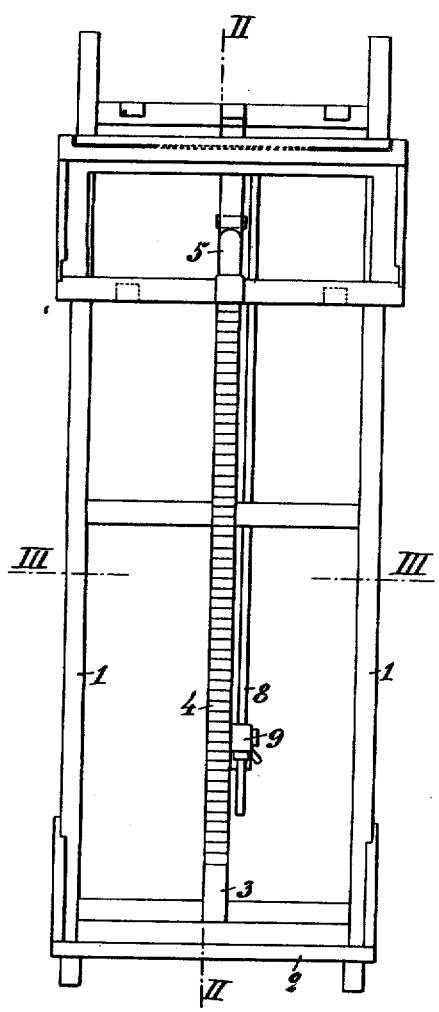
Figure 1 shows a front view of the vertical stand.
Figure 3:
Fig. 3 is a horizontal section on line III—III Fig. 1.
Figure 2:
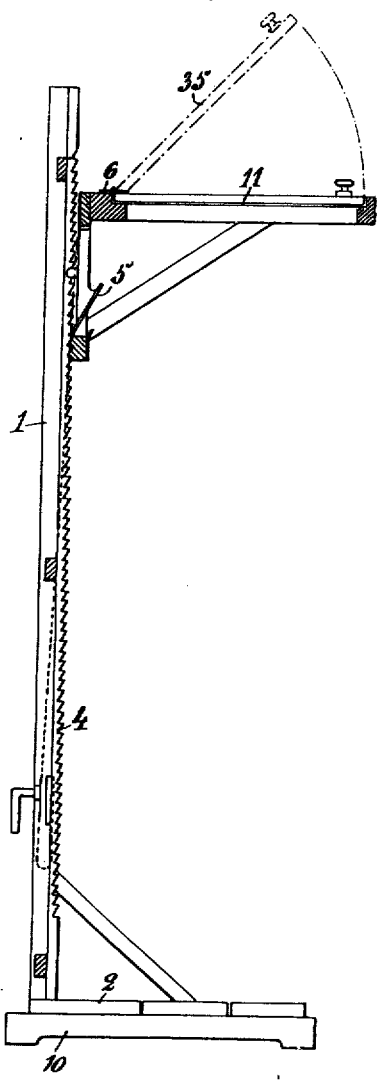
Fig. 2 is a vertical cross section on line II—II.

The apparatus consists of a vertical stand Figs. 1 and 2, with horizontal base 2, on which is placed the printing apparatus and above this the camera. The stand consists of upright poles 1, 1. Furthermore parallel with the poles 1, a pawl rod 3 with pawl teeth 4 coöperating with a pawl 5 —which may be springy—is applied on the frame 6 displaceable on the stand in vertical direction. The frame can thereby be held fast in any height desired above the base 2, and can be adjusted by the tightening device 9 according to the adjustment of the frame desired, so that the said frame, after having been lowered, can be raised again to exactly the same height.

This is of importance, partly in order to enable, after the focusing of the picture, to permit the sensitive paper to be placed in the frame 6 by lowering this to ordinary table level instead of being obliged to get up on a chair and partly to permit the right distance for the frame 6 to be easily found by pulling it up until the ribbon 8 is tightened for the several enlargements. The stand is besides mounted on feet 10 and can be fitted with adjusting-screws in order to secure an exactly horizontal position of the base 2.

The frame 6 incloses a glass plate 11 and a hinged back 35 which forms a—may be dual—lid, which by its weight keeps in position the sensitive paper which is placed on the glass plate, the lower side of the lid may be covered with white cardboard or the like in order to serve as focusing plate.

The printing and enlarging-apparatus itself consists of a box 13 inclosing a light-source 12, with reflecting mirrors 14, and of an insertion 16 placed on the box and on the insertion a camera 25 with lens 29.

In the box 13, besides the ordinary incandescent lamps, a red lamp 15 can be fitted in the circuit of current in such way that by the same switch the red light can be changed to white and the red lamp be used when placing the sensitive paper.

By using a great quantity of light, e. g., 4 or 6 100-cdls. ½-watt bulbs and by proper well known devices for equal dispersing of the light it will be possible, with a rather short exposure, to get as large a linear enlargement as can be obtained from the particular lens and the distances between the negative and the lens and the frame 6 and the lens respectively, and furthermore to make enlargements from rather large negatives, e. g., 24x30 cm. Otherwise, the latter advantage would not be obtained, but by using a large and very expensive condenser, which could not easily be placed above a much heating light-source, such as for instance an arc lamp, or by an arrangement of indirect lighting and which would not only require a very long exposure but would enlarge the volume of the apparatus. These many and strong bulbs heat however, very much, and this is neutralized by the upper part 16 of the printing apparatus being detachable and smaller than the light-box 13, so that between them both a canal 36 is formed on all four sides, which is utilized for light ventilation the warm air passing from the inside of the light-box through some oblong holes 37 in two opposite sides of the insertion or upper part 16, into the said canal, and from this around its corners and through some corresponding oblong holes 38 in two opposite sides of the box 13, out into the room. The upper part being detachable presents the great convenience that there is easy access to the bulbs, in order for instance to exchange them with weaker ones, when the apparatus is used for contact printing.

The upper part 16 has independent ventilation arrangement in known manner but for further protection of the negative from heating, it is provided with two, three or more glass plates 17, 18 and 19 joining closely to the sides of the upper part 16 so that between the plates are formed stationary isolating air cushions, which involves that the negative is kept completely cool. The reflecting mirrors neutralize a too strong heating of the sides of the box 13.

Of the plates 17, one or more can be a ground-glass or an opal glass, in order to spread the light and secure a uniform lighting of the negative. By contact printing, the latter is placed on a plate glass 39 in the upper part 16, and by enlargements normally on the same place. The insertion 16 contains another glass plate 20, resting on two pairs of crank arms 22 and 23, connected by a couple of parallel slides 21, the pair 23 revolving on a common shaft 24 with finger grip 25ª and clamping-screw 40 so that the plate 20 can be raised and lowered and secured in the height desired. This glass plate as well as the adjustment of it serve the object by contact printing as well as by enlarging of enabling a vignette to be placed on the plate at a greater or smaller distance from the negative, so that the vignetting becomes softer or sharper respectively, and, when enlarging or diminishing, it sometimes assists, as it permits the negative being placed on the plate 20 instead of on the plate 39, which in this case is withdrawn.

On the top of the insertion 16 the camera is placed consisting of a frame 25 which at the top, by a hinge is joined to a plate 26 with a hole 27. On the plate 26 the lens board 28 is placed. This can be loosely placed on the plate 26, so that it can easily be displaced in view of the adjustment in the side directions. Its displacement is confined by frame lists 41 along the edges of the plate 26.

In order to adjust the lens 29 in the direction of height, the plate 26 is connected with the sides of the frame 25 by long wooden or metallic lists 30 hinged together, and by a folded cloth or bellow 31.

The adjustment is made by a screw spindle 32 with handle 33. When the spindle is turned to one side or other, the plate 26 will either be raised or lowered, and on account of the long guiding lists 30, the movement of the plate will always be parallel with itself.

The apparatus acts as follows:

When doing ordinary printing work—contact printing on gas-light or bromid paper—the camera 25 with fittings is removed, and the negative is placed on the glass plate 39. If the picture is desired to be vignetted, the vignette is placed on the plate 20, which is adjusted in the height desired. Thereupon, while the red light is lighted the sensitive paper is placed on the negative, a dual lid 42 hinged to the insertion 16,—which lid on the Fig. 5 is shown in shut down position and turned aside,—is shut down and pressed—with or without the use of special means—against the paper during a suitable period of time. The paper is then removed and developed.

When negatives are enlarged or diminished, the whole apparatus is used, the printing apparatus, the lid 42 of which is opened, being placed on the base 2.

The negative is placed on the plate 39 the white light is lighted in the light-box 13, and the height of the frame 6 above the apparatus is determined according to the size desired of the positive. Thereupon the lens is adjusted by means of the handle 33, until the picture stands out sharply on the white cardboard in the frame 6, and the lens panel 28 is displaced, until the picture is seen to be in its proper place in the frame.

The focusing of the picture limitation can also be obtained by displacing the whole apparatus—or by turning it—on the base.

When the picture is finally focused, the band or ribbon 8 is introduced in the tightening apparatus, tightened and secured. Then the pawl 5 is loosened on the frame 6 is lowered to table level, the lids 35 are opened and the sensitive paper is now introduced, the light being red, the lids 35 are shut down, and the frame 6 is raised, until it stops by the band 8 being tightened, the pawl is then in the same tooth, and the frame 6 in the same height as after the focusing. The exposure is now made by lighting the white light, which is again changed to red light the frame 6 is lowered, the paper removed and developed.

In order to be able, by a suitable height of the stand, to make as great enlargements as possible, the lens must have a relatively short focal length, and the grade of the extension of the camera must be adjusted according to the lenses and the grades of enlargement or diminution which are intended or desired to be used.

In order to be able to enlarge from large negatives it is often necessary however, to use larger focal lengths than usual, and a larger total extension is then required. This is obtained by inserting an insertion frame 43 of suitable height Fig. 6 between the insertion 16 and the frame 25. This can of course also be obtained by placing a frame between the plate 26 and the lens panel 28. In many cases it is enough to place the negative on the plate 20, the plate 39 being then removed. This can often be a very great advantage, as the height of the present frames for elongating the extension does not always correspond with the focal length of the lenses.

Diminutions are made in the same manner as enlargements, with the exception that the distance from the negative to the lens must be greater, than the distance from the latter to the paper, while the opposite, is the case by enlargements, and that the position of the frame 6, after the focusing often will be so low that it will be unnecessary to move this in order to insert the paper. Instead of on the white cardboard, the focusing can be made on a ground-glass or the like, which is placed on the glass in the frame 6, the lid of which is then opened, and the picture is contemplated from above.

On the glass in the frame 6 can be placed disks of black cardboard for the different sizes of picture, which facilitates the focusing as well as the placing of the paper very much.

Besides the other said advantages the vertical enlarging presents the following, that the ordinary holes and white circles marks of the drawing-pins by which the paper, by horizontal enlarging, is attached to the board are avoided. The grooves in the frame 6, in which the glass reposes, can at some places be removed, so that the glass is easily dusted, lest dust or the like should stand out on the paper during the exposure.

If the picture is desired to be vignetted, this can be done in two ways. Either the negative is placed on the plate 39, and the vignette below it on the plate 20 or the negative is placed on one of these two plates, and the three-sided box 44, shown in Fig. 8, is placed on the same glass with the vignette inserted in one of the notches 45, so that the vignette is at a proper height above the negative. In the former case, light will be reflected from the negative to the surface of the vignette, and the finished positive will, consequently, outside the vignetted picture, show a weaktone, in the latter case, the positive will be quite white outside the vignetting.

In the former case, a very beautiful effect can be obtained by oval vignetting of the picture, and a broad rectangular, quite white border around the above named weaktone can be obtained by placing on the negative the box shown in Fig. 8 with a rectangular disk inserted, accordingly by a combination of both methods of vignetting.

In order to be able to displace the negative with regard to the vignette or vice versa, the camera 25 can be fitted with a door 34, through which a hand can be introduced.

A yard measure 46, revolving on one of its ends and with stopper 47 for vertical position, can be attached to the camera, so that the height of the apparatus can be ascertained.

By marking certain measures on the stand for the height of the frame, certain grades of linear enlargement can be made with the same lens, without being obliged to focus in the usual way. This can be of great importance by many kinds of works.

In order to prevent always to be obliged when focusing to bend the back of the head backward in order to contemplate the picture on the cardboard in the frame 6 which sometimes can be very fatiguing, the focusing can be made by means of a mirror.

In this case, a board 28ª, the middle of which is provided with a hole through which the lens can pass, is placed on the lens panel 28 and at one end the board is provided with a revolving and adjustable mirror 49 which accordingly can be adjusted to reflect the picture in the frame 6 from any eye height; at the other end it has a smaller likewise revolving board 48 or the like, which serves to protect the eye from the rays coming from the lens, and thereby it facilitates the contemplation of the picture in the mirror.

The bulbs in the light-box can be fitted so that they can be lighted and extinguished separately in order to prevent some parts of the negative from being too dense or too sharp.

The invention itself is not contingent on the constructive details.

What I claim, and desire to secure by Letters Patent is:

1. A combined printing, enlarging and diminishing apparatus, comprising a printing apparatus having a negative holder, a source of light, reflectors and a lens, and a stand for supporting the printing apparatus, said stand having a base on which the printing apparatus rests, standards secured to the base adjacent one edge thereof, a frame for the sensitive paper slidably mounted on the standards, said frame projecting from the standards over the base, means of adjustably supporting the frame on the standards, and adjustable means for limiting the upward movement of the frame.

2. The combination with a printing, enlarging and diminishing apparatus, of a stand for supporting the same, said stand comprising a base for the apparatus to rest on, standards secured to the base, a toothed bar between the standards, a frame for the sensitive paper mounted to slide on the standards, a pawl carried by the frame and engaging the said bar, a ribbon secured to the frame, and means for adjusting the length of the ribbon according to the adjustment of the frame.

3. In an apparatus of the character described, a stand, a vertically movable sensitive paper carrying frame on the stand, means for adjusting said frame, and an adjustable band for limiting the height to which the frame can be raised, and for permitting the frame when lowered to be raised to the same height to which it was before being lowered.

4. In an apparatus of the character described, a casing containing a light and reflectors, an extension mounted on the casing, a glass plate in the extension, a pair of crank arms upon which the plate rests, members connecting the crank arms, and means for operating one pair of crank arms.

5. In an apparatus of the character described, a casing containing a light and reflectors, an extension for receiving the negative mounted on the casing, and a camera mounted on the extension and provided with a bellows carrying a lens, hinged guiding strips hinged to the top plate of the bellows and in the sides of the camera, and a screw spindle mounted in the top plate of the bellows and engaging the body of the camera.

6. In an apparatus of the character described, a stand having an adjustable sensitive paper carrying frame, and a printing apparatus mounted on the stand and having a camera mounted thereon, the camera having an adjustable mirror mounted on its top for reflecting the picture in the frame of the stand.

In testimony whereof I affix my signature in presence of two witnesses.

JENS PETER HANSEN.

Witnesses:
F. WEINGROW,
ELLEN ROEPKE.